United States Patent [19]

Hlad

[11] Patent Number: 4,860,483
[45] Date of Patent: Aug. 29, 1989

[54] ROD HANDLE

[76] Inventor: Myron Hlad, 428 25th Ave. No., St. Cloud, Minn. 56303

[21] Appl. No.: 164,883

[22] Filed: Mar. 7, 1988

[51] Int. Cl.⁴ ............................................. A01K 87/00
[52] U.S. Cl. .......................................... 43/18.1; 43/23
[58] Field of Search ................... 43/18.1, 18.5, 22, 23, 43/25

[56] References Cited

U.S. PATENT DOCUMENTS

| | | | |
|---|---|---|---|
| 3,419,992 | 1/1969 | Strahm | 43/22 |
| 3,685,195 | 8/1972 | Merryweather | 43/18.1 |
| 4,027,419 | 6/1977 | Popeil | 43/23 |
| 4,041,635 | 8/1977 | Savage | 43/25 |
| 4,519,159 | 5/1985 | Fazio | 43/25 |
| 4,651,461 | 3/1987 | Williams | 43/23 |

Primary Examiner—Gene P. Crosby
Attorney, Agent, or Firm—Albert W. Watkins

[57] ABSTRACT

A fishing rod of compact size and improved feel and control is disclosed. In the preferred embodiment the rod includes a C or U-shaped handle portion, a reel support mounted to said C or U-shaped section, and a rod passing through the two ends of said C or U-shaped section. By attaching the aforementioned reel to a handle entirely separate from said rod, all breakage forces are carried by the handle, allowing for a smaller, more flexible rod. Additionally, due to the nature of the design, the rod may be held in two different positions by the fisher, enabling change of grip for greatest comfort.

14 Claims, 1 Drawing Sheet

ROD HANDLE

BACKGROUND OF THE INVENTION

The present invention relates to rod and reel combinations for fishing, and specifically to compact rods such as would be used for ice fishing or compact transport.

Fishing rods of the prior art tend to be long, gently tapering poles which have a small tip and a substantially larger handle. As can be expected, these long rods provide little in the way of delicate control needed to jig a small ice fishing hole. Further, the long poles tend to be difficult to transport and usually require some form of breakdown into sections. The smaller rods, exemplified by U.S. Pat. Nos. 3,685,195, 3,778,916, and 4,027,419 to Merryweather, Wallace, and Popeil respectively, have the drawback of reduced sensitivity to biting fish. Even in the larger rods this may be a drawback, and many systems have been devised to improve the fisherman's awareness of the fish. Such a system is demonstrated by Wiebe in U.S. Pat. No. 4,398,369, where a special finger grip is provided to add some sensitivity to the long rod. Other systems prevail such as tip-up indicators.

SUMMARY OF THE INVENTION

The purpose of the present invention is to provide a compact fishing rod which is suitable for jigging a small ice fishing hole, while providing better detection of biting fish than many large rods. Additionally, the fishing rod is balanced in such a way as to make jigging as effortless as possible.

Disclosed is a fishing rod having a large C or U-shaped handle section which supports a reel or wind up. Through the hand section at two points passes a small rod. The handle section thereby supports the reel or wind-up, while allowing the user to directly contact the small rod to get the best sensitivity to biting fish. Additionally, due to the design, the fisher may also rotate the handle section about the axis of the rod and grasp the rod directly without risking damage to the small rod. Finally, since the bulk of the fishing rod is in the handle portion, the fishing rod is easily balanced in the palm of the hand for effortless jigging.

DETAILED DESCRIPTION OF THE INVENTION

Figure 1:
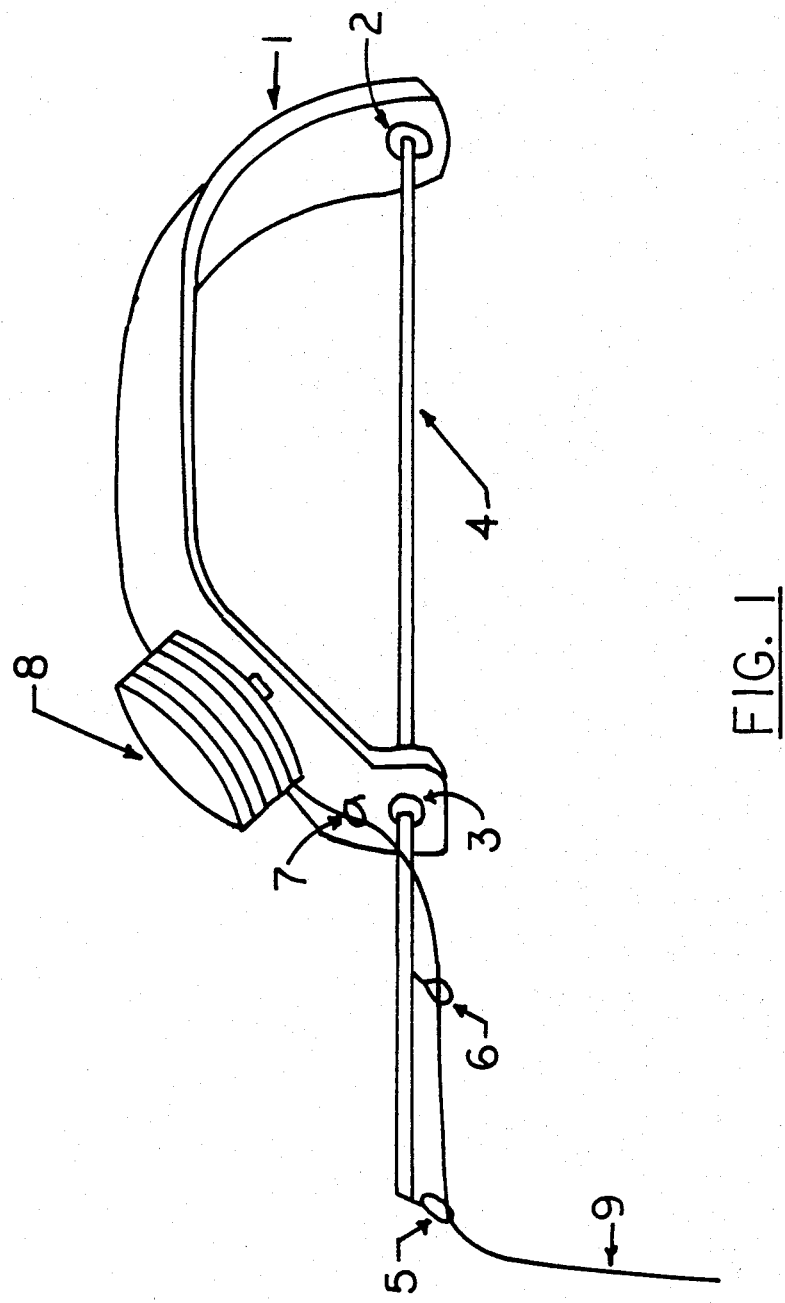
FIG. 1 shows the preferred embodiment of the present invention.

In reference to FIG. 1, a C or U-shaped handle 1 carrying a reel 8 of fishing line 9 is shown. Inserted into handle 1 at both ends are corks 2 and 3. Passing through corks 2 and 3 is small rod 4. Rod 4 carries eyelets 5, 6, and 7 which guide fishing line 9 along rod 4 in the proper manner.

Operation of the fishing rod is as follows. In normal position, a fisherman grasps handle 1 between thumb and fingers. The fingers may then extend into contact with rod 4 directly, without interfering with line 9. Additionally, reel 8 is supported entirely by handle 1, such that a small, flexible shaft may be used for rod 4. This differs from conventional rods, since conventional rods require a bulky handle section to support the reel, reducing feel of bites.

Further, in the preferred embodiment the fisherman may choose to balance the rod and reel combination upside down. This is accomplished by supporting rod 4 directly between the thumb and fingers, with handle 1 hanging down. At first, this may seem contradictory to the goal of reducing the load on rod 9 (so as to enable a smaller more flexible rod). In fact, since the C or U-shaped section is little larger than one's hand, the forces which may now be applied to rod 4 are almost entirely shear forces at corks 2 and 3. As is well known, most materials have relatively large shear strengths, as opposed to the flexural strength limit which is responsible for the breaking of most rods.

Corks 2 and 3, though not necessary to the present invention, are described herein because they provide enhanced flex of rod 4, leading to even better sensitivity for the fisherman.

The foregoing description details when the inventor has thought to be the best mode of the present invention. The foregoing description is in no way intended to be limiting, and changes which are within the scope of one of ordinary skill in the art are considered to be encompassed within the foregoing description.

Having thus described my invention, I claim:

1. A fishing rod comprising
   a handle means for grasping by a human hand,
   a flexible rod,
   plural resilient means for attaching said handle means to said flexible rod,
   said flexible rod being absolutely responsive to positioning of said handle means,
   a minimum distance of said rod between a first and a second of said plural resilient attaching means void of any of said plural resilient attaching means, wherein
   said minimum distance is greater than a distance required for grasping by a human hand, and wherein
   said handle means is substantially continuous between said first and said second resilient attaching means and is spaced from said minimum distance of said flexible rod by a first distance sufficient to allow insertion of a human hand therebetween.

2. The fishing rod of claim 1 wherein said means for attaching is comprised by cork.

3. The fishing rod of claim 1 wherein said means for attaching is comprised by an adhesive.

4. The fishing rod of claim 1 wherein said handle means is comprised by a C or U-shaped member.

5. The fishing rod of claim 1 wherein said handle means further comprises a mount for a line storing means.

6. The fishing rod of claim 1 wherein said handle means is of substantially the same length as said hand.

7. The fishing rod of claim 1 wherein either of said handle means and said minimum distance of said rod may be held without sacrificing control of said fishing rod or balance of said fishing rod.

8. A fishing rod comprising
   a handle means for grasping by a human hand,
   a flexible rod,
   plural resilient means for attaching said handle means to said flexible rod,
   minimum distance of said rod between a first and a second of said plural resilient attaching means void of any of said plural resilient attaching means, wherein
   said handle means is substantially continuous between said first and said second resilient attaching means and is spaced from said minimum distance of said flexible rod by a first distance sufficient to allow insertion of a human hand therebetween, and wherein said fishing rod flexes during normal use by a fisherperson, and wherein said first distance changes responsive to said flexing of said fishing rod.

9. The fishing rod of claim 8 wherein said means for attaching is comprised by cork.

10. The fishing rod of claim 8 wherein said means for attaching is comprised by an adhesive.

11. The fishing rod of claim 8 wherein said handle means is comprised by a C or U-shaped member.

12. The fishing rod of claim 8 wherein said handle means further comprises a mount for a line storing means.

13. The fishing rod of claim 8 wherein said handle means is of substantially the same length as said hand.

14. The fishing rod of claim 8 wherein either of said handle means and said minimum distance of said rod may be held without sacrificing control of said fishing rod or balance of said fishing rod.

* * * * *